(12) United States Patent
Chao et al.

(10) Patent No.: US 6,924,809 B2
(45) Date of Patent: Aug. 2, 2005

(54) METHOD AND BUFFER DEVICE FOR DATA STREAM TRANSFORMATION

(75) Inventors: Tzu-Yi Chao, Hsinchu Hsien (TW); Chih-Hung Lu, Hsinchu Hsien (TW)

(73) Assignee: Pixart Imaging Inc., Hsinchu Hsien (TW)

(*) Notice: Subject to any disclaimer, the term of this patent is extended or adjusted under 35 U.S.C. 154(b) by 0 days.

(21) Appl. No.: 10/758,746

(22) Filed: Jan. 13, 2004

(65) Prior Publication Data

US 2005/0073525 A1 Apr. 7, 2005

(30) Foreign Application Priority Data

Oct. 2, 2003 (TW) ........................................ 92127299 A (51) Int. Cl.[7] ................................................ G09G 5/39
(52) U.S. Cl. ...................................... 345/531; 345/564
(58) Field of Search ................................. 345/501, 530, 345/531, 563, 545, 558; 348/384.1, 390.1, 403.1, 408.1, 473, 474, 716, 718; 375/240, 240.01, 240.18; 382/232, 248, 276, 277; 710/52, 56, 65, 66

(56) References Cited

U.S. PATENT DOCUMENTS

| | | | | |
|---|---|---|---|---|
| 5,764,277 A | * | 6/1998 | Loui et al. | ................ 348/14.01 |
| 6,549,577 B2 | * | 4/2003 | Florencio et al. | ....... 375/240.21 |
| 6,735,633 B1 | * | 5/2004 | Welch et al. | ................ 709/233 |

* cited by examiner

Primary Examiner—Kee M. Tung
(74) Attorney, Agent, or Firm—Darby & Darby (57) ABSTRACT

In a method and buffer device for data stream transformation, a buffer memory is configured into addressable locations for writing an input data stream therein, a label memory is used for storing write and read labeled positions, and a buffer controller is connected to the buffer memory and the label memory. The buffer controller controls the writing of the input data stream into the addressable locations of the buffer memory according to the write labeled positions and a write data sequence, calculates the read labeled positions corresponding to the write labeled positions in accordance with the write data sequence and a read data sequence, updates the read labeled positions stored in the label memory, and reads data from the addressable locations of the buffer memory with reference to the read labeled positions stored in the label memory so as to generate an output data stream.

11 Claims, 9 Drawing Sheets

| $O_1(0)$ | $I_1(1)$ | $I_1(2)$ | ... | $I_1(79)$ |
|---|---|---|---|---|
| $O_1(1)$ | $I_1(81)$ | $I_1(82)$ | ... | $I_1(159)$ |
| $O_1(2)$ | $I_1(161)$ | $I_1(162)$ | ... | $I_1(239)$ |
| $O_1(3)$ | $I_1(241)$ | $I_1(242)$ | ... | $I_1(319)$ |
| $O_1(4)$ | $I_1(321)$ | $I_1(322)$ | ... | $I_1(399)$ |
| $O_1(5)$ | $I_1(401)$ | $I_1(402)$ | ... | $I_1(479)$ |
| $O_1(6)$ | $I_1(481)$ | $I_1(482)$ | ... | $I_1(559)$ |
| $I_1(560)$ | $I_1(561)$ | $I_1(562)$ | ... | — |

FIRST READ OPERATION ↓
FIRST WRITE OPERATION →

F I G. 6

| $O_1(0)$ | $O_1(8)$ | $O_1(16)$ | ... | $I_1(10)$ | ... | $I_1(79)$ |
|---|---|---|---|---|---|---|
| $O_1(1)$ | $O_1(9)$ | $O_1(17)$ | ... | $I_1(90)$ | ... | $I_1(159)$ |
| $O_1(2)$ | $O_1(10)$ | $O_1(18)$ | ... | $I_1(170)$ | ... | $I_1(239)$ |
| $O_1(3)$ | $O_1(11)$ | $O_1(19)$ | ... | $I_1(250)$ | ... | $I_1(319)$ |
| $O_1(4)$ | $O_1(12)$ | $O_1(20)$ | ... | $I_1(330)$ | ... | $I_1(399)$ |
| $O_1(5)$ | $O_1(13)$ | $O_1(21)$ | ... | $I_1(410)$ | ... | $I_1(479)$ |
| $O_1(6)$ | $O_1(14)$ | $O_1(22)$ | ... | $I_1(490)$ | ... | $I_1(559)$ |
| $O_1(7)$ | $O_1(15)$ | $O_1(23)$ | ... | $I_1(570)$ | ... | $I_1(639)$ |

F I G. 7

| | | | | | | |
|---|---|---|---|---|---|---|
| $I_2(0)$ | $O_1(8)$ | $O_1(16)$ | ... | $O_1(80)$ | ... | $I_1(79)$ |
| $I_2(1)$ | $O_1(9)$ | $O_1(17)$ | ... | $O_1(81)$ | ... | $I_1(159)$ |
| $O_1(2)$ | $O_1(10)$ | $O_1(18)$ | ... | $I_1(170)$ | ... | $I_1(239)$ |
| $O_1(3)$ | $O_1(11)$ | $O_1(19)$ | ... | $I_1(250)$ | ... | $I_1(319)$ |
| $O_1(4)$ | $O_1(12)$ | $O_1(20)$ | ... | $I_1(330)$ | ... | $I_1(399)$ |
| $O_1(5)$ | $O_1(13)$ | $O_1(21)$ | ... | $I_1(410)$ | ... | $I_1(479)$ |
| $O_1(6)$ | $O_1(14)$ | $O_1(22)$ | ... | $I_1(490)$ | ... | $I_1(559)$ |
| $O_1(7)$ | $O_1(15)$ | $O_1(23)$ | ... | $I_1(570)$ | ... | $I_1(639)$ |

(SECOND WRITE OPERATION ↓)

FIG. 8

| | | | | | | |
|---|---|---|---|---|---|---|
| $I_2(0)$ | $I_2(8)$ | $I_2(16)$ | ... | $I_2(80)$ | ... | $O_1(632)$ |
| $I_2(1)$ | $I_2(9)$ | $I_2(17)$ | ... | $I_2(81)$ | ... | $O_1(633)$ |
| $I_2(2)$ | $I_2(10)$ | $I_2(18)$ | ... | $I_2(82)$ | ... | $O_1(634)$ |
| $I_2(3)$ | $I_2(11)$ | $I_2(19)$ | ... | $I_2(83)$ | ... | $O_1(635)$ |
| $I_2(4)$ | $I_2(12)$ | $I_2(20)$ | ... | $I_2(84)$ | ... | $O_1(636)$ |
| $I_2(5)$ | $I_2(13)$ | $I_2(21)$ | ... | $I_2(85)$ | ... | $O_1(637)$ |
| $I_2(6)$ | $I_2(14)$ | $I_2(22)$ | ... | $I_2(86)$ | ... | $O_1(638)$ |
| $I_2(7)$ | $I_2(15)$ | $I_2(23)$ | ... | $I_2(87)$ | ... | $O_1(639)$ |

FIG. 9

|  | | | | | | |
|---|---|---|---|---|---|---|
| ↙ SECOND READ OPERATION | | | | ↙ SECOND READ OPERATION | | |
| $O_2(0)$ | $I_2(8)$ | $I_2(16)$ | ... | $O_2(1)$ | ... | $O_1(632)$ |
| $I_2(1)$ | $I_2(9)$ | $I_2(17)$ | ... | $I_2(81)$ | ... | $O_1(633)$ |
| $I_2(2)$ | $I_2(10)$ | $I_2(18)$ | ... | $I_2(82)$ | ... | $O_1(634)$ |
| $I_2(3)$ | $I_2(11)$ | $I_2(19)$ | ... | $I_2(83)$ | ... | $O_1(635)$ |
| $I_2(4)$ | $I_2(12)$ | $I_2(20)$ | ... | $I_2(84)$ | ... | $O_1(636)$ |
| $I_2(5)$ | $I_2(13)$ | $I_2(21)$ | ... | $I_2(85)$ | ... | $O_1(637)$ |
| $I_2(6)$ | $I_2(14)$ | $I_2(22)$ | ... | $I_2(86)$ | ... | $O_1(638)$ |
| $I_2(7)$ | $I_2(15)$ | $I_2(23)$ | ... | $I_2(87)$ | ... | $O_1(639)$ |

FIG. 10

FIRST WRITE OPERATION ↓

| $I_1(0)$ | $I_1(8)$ | $I_1(16)$ | ... | — |
|---|---|---|---|---|
| $I_1(1)$ | $I_1(9)$ | $I_1(17)$ | ... | — |
| $I_1(2)$ | $I_1(10)$ | $I_1(18)$ | ... | — |
| $I_1(3)$ | $I_1(11)$ | $I_1(19)$ | ... | — |
| $I_1(4)$ | $I_1(12)$ | $I_1(20)$ | ... | — |
| $I_1(5)$ | $I_1(13)$ | $I_1(21)$ | ... | — |
| $I_1(6)$ | $I_1(14)$ | $I_1(22)$ | ... | — |
| $I_1(7)$ | $I_1(15)$ | $I_1(23)$ | ... | — |

FIG. 11

FIRST READ OPERATION →

| $O_1(0)$ | $O_1(1)$ | $O_1(2)$ | ... | $O_1(7)$ | ... | $I_1(632)$ |
|---|---|---|---|---|---|---|
| $I_1(1)$ | $I_1(9)$ | $I_1(17)$ | ... | | ... | $I_1(633)$ |
| $I_1(2)$ | $I_1(10)$ | $I_1(18)$ | ... | | ... | $I_1(634)$ |
| $I_1(3)$ | $I_1(11)$ | $I_1(19)$ | ... | | ... | $I_1(635)$ |
| $I_1(4)$ | $I_1(12)$ | $I_1(20)$ | ... | | ... | $I_1(636)$ |
| $I_1(5)$ | $I_1(13)$ | $I_1(21)$ | ... | | ... | $I_1(637)$ |
| $I_1(6)$ | $I_1(14)$ | $I_1(22)$ | ... | | ... | $I_1(638)$ |
| $I_1(7)$ | $I_1(15)$ | $I_1(23)$ | ... | | ... | $I_1(639)$ |

F I G. 12

SECOND WRITE OPERATION →

FIRST READ OPERATION ↓

| $I_2(0)$ | $I_2(1)$ | $I_2(2)$ | ... | $I_2(7)$ | ... | $I_2(79)$ |
|---|---|---|---|---|---|---|
| $O_1(80)$ | $O_1(81)$ | $O_1(82)$ | ... | $O_1(87)$ | ... | $I_1(633)$ |
| $I_1(2)$ | $I_1(10)$ | $I_1(18)$ | ... | | ... | $I_1(634)$ |
| $I_1(3)$ | $I_1(11)$ | $I_1(19)$ | ... | | ... | $I_1(635)$ |
| $I_1(4)$ | $I_1(12)$ | $I_1(20)$ | ... | | ... | $I_1(636)$ |
| $I_1(5)$ | $I_1(13)$ | $I_1(21)$ | ... | | ... | $I_1(637)$ |
| $I_1(6)$ | $I_1(14)$ | $I_1(22)$ | ... | | ... | $I_1(638)$ |
| $I_1(7)$ | $I_1(15)$ | $I_1(23)$ | ... | | ... | $I_1(639)$ |

F I G. 13

| $I_2(0)$ | $I_2(1)$ | $I_2(2)$ | ... | $I_2(8)$ | ... | $I_2(79)$ |
|---|---|---|---|---|---|---|
| $I_2(80)$ | $I_2(81)$ | $I_2(82)$ | ... | $I_2(88)$ | ... | $I_2(159)$ |
| $I_2(160)$ | $I_2(161)$ | $I_2(162)$ | ... | $I_2(168)$ | ... | $I_2(239)$ |
| $I_2(240)$ | $I_2(241)$ | $I_2(242)$ | ... | $I_2(248)$ | ... | $I_2(319)$ |
| $I_2(320)$ | $I_2(321)$ | $I_2(322)$ | ... | $I_2(328)$ | ... | $I_2(399)$ |
| $I_2(400)$ | $I_2(401)$ | $I_2(402)$ | ... | $I_2(408)$ | ... | $I_2(479)$ |
| $I_2(480)$ | $I_2(481)$ | $I_2(482)$ | ... | $I_2(488)$ | ... | $I_2(559)$ |
| $I_2(560)$ | $I_2(561)$ | $I_2(562)$ | ... | $I_2(568)$ | ... | $O_1(639)$ |

F I G. 14

SECOND READ OPERATION      SECOND READ OPERATION

| $O_2(0)$ | $I_2(1)$ | $I_2(2)$ | ... | $O_2(1)$ | ... | $I_2(79)$ |
|---|---|---|---|---|---|---|
| $I_2(80)$ | $I_2(81)$ | $I_2(82)$ | ... | $I_2(88)$ | ... | $I_2(159)$ |
| $I_2(160)$ | $I_2(161)$ | $I_2(162)$ | ... | $I_2(168)$ | ... | $I_2(239)$ |
| $I_2(240)$ | $I_2(241)$ | $I_2(242)$ | ... | $I_2(248)$ | ... | $I_2(319)$ |
| $I_2(320)$ | $I_2(321)$ | $I_2(322)$ | ... | $I_2(328)$ | ... | $I_2(399)$ |
| $I_2(400)$ | $I_2(401)$ | $I_2(402)$ | ... | $I_2(408)$ | ... | $I_2(479)$ |
| $I_2(480)$ | $I_2(481)$ | $I_2(482)$ | ... | $I_2(488)$ | ... | $I_2(559)$ |
| $I_2(560)$ | $I_2(561)$ | $I_2(562)$ | ... | $I_2(568)$ | ... | $O_1(639)$ |

F I G. 15

METHOD AND BUFFER DEVICE FOR DATA STREAM TRANSFORMATION

CROSS-REFERENCE TO RELATED APPLICATION

This application claims priority of Taiwanese application No. 092127299, filed on Oct. 2, 2003.

BACKGROUND OF THE INVENTION

1. Field of the Invention

The invention relates to a method and buffer device for data stream transformation, more particularly to a method and buffer device for data stream transformation between line-based and block-based data streams.

2. Description of the Related Art

Figure 1:
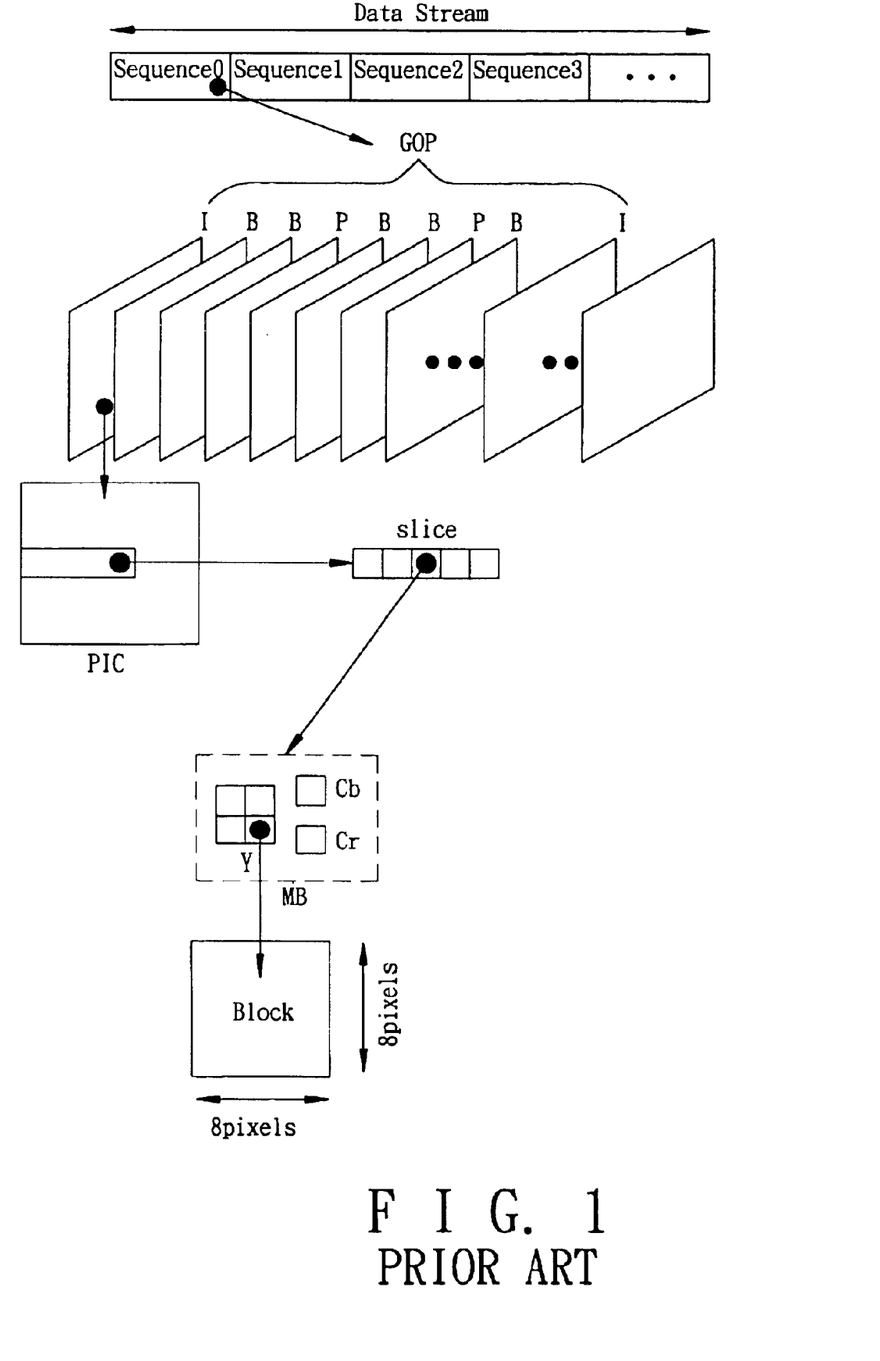
FIG. 1 is a schematic diagram to illustrate MPEG data structures.

JPEG and MPEG are international standards in the fields of static and dynamic image compression, respectively. In the case of MPEG, as shown in FIG. 1, a data structure thereof consists of at least one sequence that includes a plurality of groups of pictures (abbreviated as GOP). Each picture is further subdivided into a plurality of slices. Each slice is further subdivided into a plurality of macro blocks (abbreviated as MB). Each macro block can be formed from four luminance blocks and a plurality of chrominance blocks. Finally, each block includes 8×8 bytes, which is defined as the smallest coding unit of the data structure in MPEG.

Figure 2:
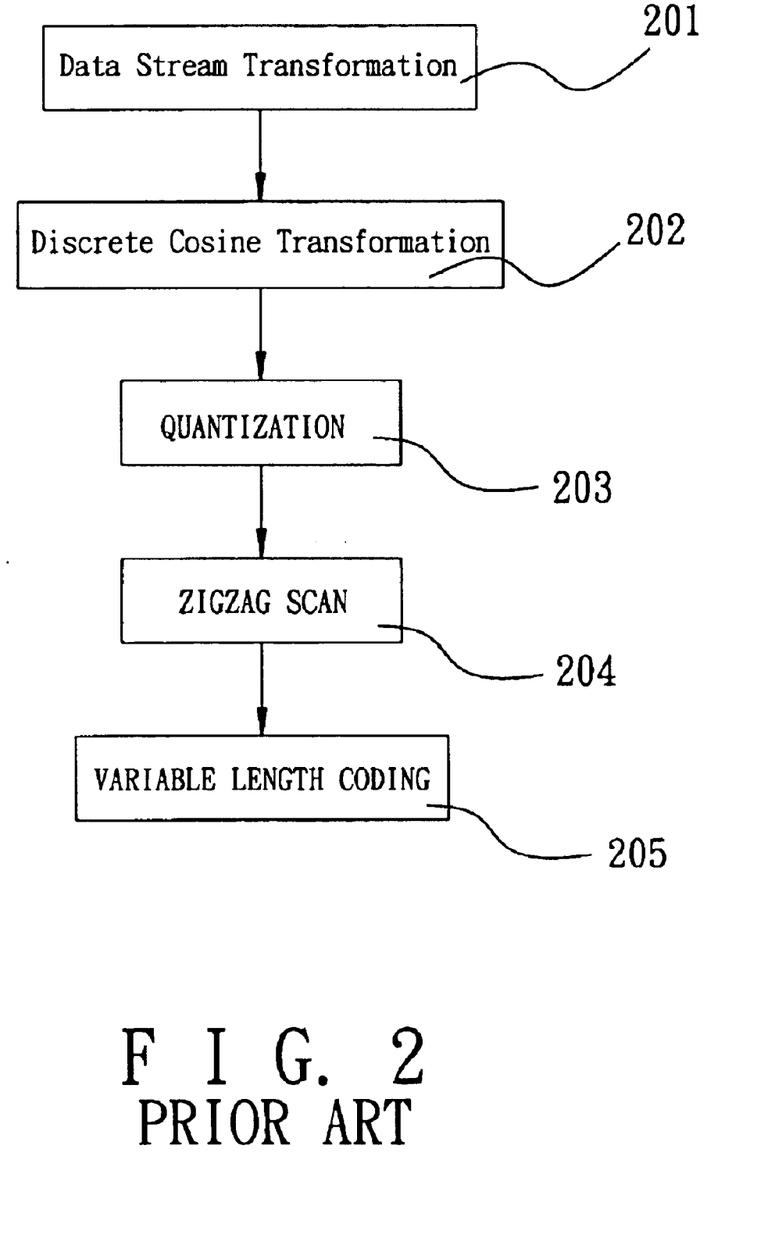
FIG. 2 is a flowchart to illustrate an MPEG compression operation.

As shown in FIG. 2, to compress original image data in an MPEG-1 or MPEG-2 format, data stream transformation is first performed so as to convert an input data stream into a block-based output data stream, as indicated in step 201. Subsequently, in step 202, pixel data in each block are converted from time domain to frequency domain using discrete cosine transformation (DCT) so as to filter out high frequency components that are insensitive to the human eye. Then, in step 203, quantization is performed so as to quantize many converted DCT coefficients to zero. Next, in step 204, a zigzag scan operation is performed to re-arrange the quantized DCT coefficients in an increasing order of frequency. Thereafter, in step 205, differential pulse coded modulation (DPCM) is performed on DC coefficients, run length encoding (RLE) is performed on AC coefficients, and variable length coding (VLC) is finally performed on both coefficients so as to complete compression in the MPEG-1/MPEG-2 format. The JPEG compression operation is similar to the aforesaid process flow. In the same token, the aforesaid process flow is reversed when decompressing data.

Figure 3:
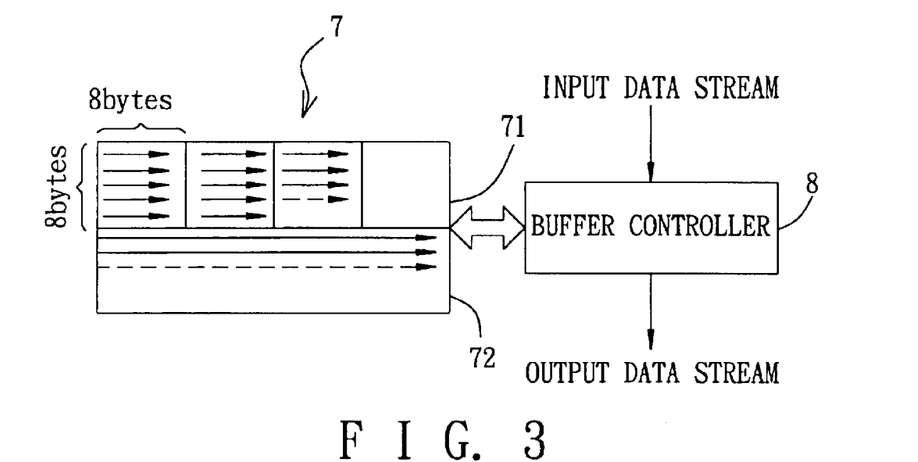
FIG. 3 is a block diagram of a conventional buffer device for data stream transformation.

Referring to FIG. 3, since both JPEG and MPEG use blocks as basic processing units, in order to transform a line-based input data stream into a block-based output data stream as required in step 201 of FIG. 2, a buffer memory 7 and a buffer controller 8 are typically used for processing.

When a data stream is written into the buffer memory 7 under the control of the buffer controller 8, the data stream is written in sequence from left to right and from top to bottom. However, since data are to be read in basic units of blocks, the buffer controller 8 will read data in a vertical direction (for example, read 8×8 bytes for output from top to bottom starting from the left topmost corner such that the content of the output data stream includes the first block). By virtue of this characteristic, data are not available for reading unless the buffer memory 7 is filled, and writing in the buffer memory 7 is possible only after data have been read therefrom.

Therefore, in general, the buffer memory 7 will be divided into two parts, where one part is used for input data, and the other part is used for output data. As shown in FIG. 3, when an upper part 71 is filled with data so that data can be outputted in units of blocks, a lower part 72 is available for a data writing operation. After data have been outputted from the upper part 71, the latter will be available for a subsequent data writing operation. Likewise, when the lower part 72 is filled with data, the data can be outputted therefrom.

Nevertheless, although the arrangement in FIG. 3 results in an increase in data input and output speeds, a large buffer memory 7 is required to ensure optimum performance.

SUMMARY OF THE INVENTION

Therefore, the object of the present invention is to provide a method and buffer device for data stream transformation with a relatively small memory requirement so as to solve the aforesaid drawback of the prior art.

According to one aspect of the present invention, there is provided a method for transforming an input data stream into an output data stream, wherein one of the input and output data streams is a line-based data stream, while the other of the input and output data streams is a block-based data stream. The method comprises the steps of: a) assigning addressable locations of a buffer memory with write labeled positions according to a write data sequence; b) writing the input data stream into the addressable locations of the buffer memory in accordance with the write labeled positions and the write data sequence; c) calculating read labeled positions corresponding to the write labeled positions in accordance with the write data sequence and a read data sequence; and d) in accordance with the read data sequence, reading data from the addressable locations of the buffer memory with reference to the read labeled positions so as to generate the output data stream.

According to another aspect of the present invention, there is provided a buffer device for transforming an input data stream into an output data stream, wherein one of the input and output data streams is a line-based data stream, while the other of the input and output data streams is a block-based data stream. The buffer device comprises a buffer memory, a label memory, and a buffer controller. The buffer memory is adapted to be configured into addressable locations for writing the input data stream therein. The label memory is used for storing write and read labeled positions. The buffer controller is connected to the buffer memory and the label memory, controls the writing of the input data stream into the addressable locations of the buffer memory in accordance with the write labeled positions and a write data sequence, calculates the read labeled positions corresponding to the write labeled positions in accordance with the write data sequence and a read data sequence, updates the read labeled positions stored in the label memory, and, in accordance with the read data sequence, reads data from the addressable locations of the buffer memory with reference to the read labeled positions stored in the label memory so as to generate the output data stream.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 4:
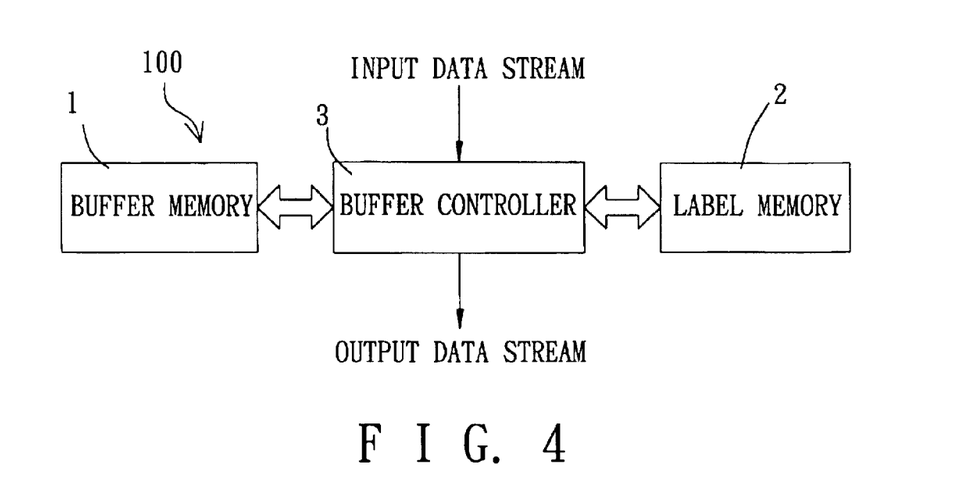
FIG. 4 is a schematic circuit block diagram of the first preferred embodiment of a buffer device for data stream transformation according to the present invention.

FIG. 4 shows the first preferred embodiment of a buffer device 100 for data stream transformation according to the present invention. In this embodiment, the buffer device 100 is used to transform a line-based input data stream into a block-based output data stream, and includes a buffer memory 1, a label memory 2 and a buffer controller 3.

Figure 5:
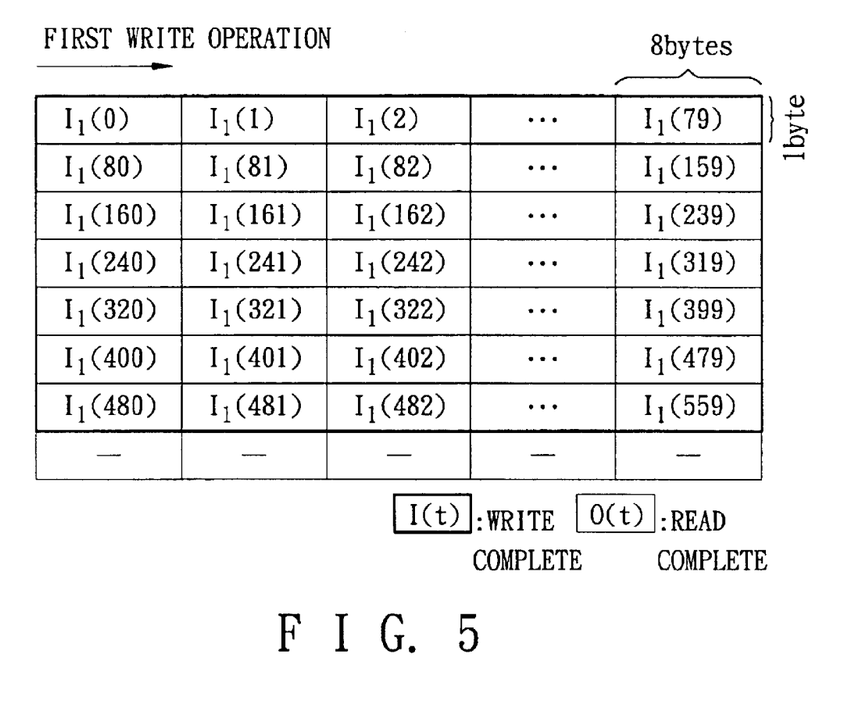
FIGS. 5 to 10 illustrate buffer content during consecutive write and read operations for transforming a line-based data stream into a block-based data stream according to the first preferred embodiment.

The buffer memory 1 is adapted for writing the input data stream therein under the control of the buffer controller 3. In this embodiment, the buffer memory 1 includes a 640×8-byte memory. In other words, the buffer memory 1 can be used to store an image with a 640×8 pixel size. In practice, the size of the buffer memory 1 should not be limited thereto and can vary depending upon actual requirements. As shown in FIG. 5, the buffer memory 1 is configured into equally sized addressable locations for writing the input data stream therein. In this embodiment, each addressable location has a size of 8×1 bytes. Therefore, the total number of addressable locations in the buffer memory 1 for this embodiment is 640.

The initial addresses of the addressable locations are labeled for subsequent read and write operations. Although each addressable location only includes a physical labeled position, for convenience of illustration, in the following description, the labeled position of each addressable location is denoted as a write labeled position $I(t)$ for a write operation, and a read labeled position $O(t)$ for a read operation, where (t) stands for a write or read sequence, and has values ranging from 0 to 639.

The block size processed in this embodiment is the smallest processing unit that complies with an MPEG or JPEG standard, and is hence 8×8 bytes. Therefore, in this embodiment, a data block is composed of eight columns of addressable locations. In addition, each data block row of the buffer memory 1 contains 80 data blocks.

For data transformation from a line-based data stream into a block-based data stream, the read labeled positions are calculated based on the formula:

$$O_n(t)=I_n((t\%\ h)\times w+(t/h)) \quad (1)$$

where $O_n(t)$ is the read labeled position for a read data sequence (t) of an nth read operation, $I_n(t)$ is the write labeled position for a write data sequence (t) of an nth write operation, (h) is the height of a data block, (w) is a total number of data blocks that can be accommodated in a single data block row of the buffer memory 1, (t % h) is the remainder of the quotient of (t) divided by (h), and (t/h) is the integer part of the quotient of (t) divided by (h).

In this embodiment, since h=8 and w=80, therefore, formula (1) can be simplified as:

$$O_n(t)=I_n((t\%\ 8)\times 80+(t/8)) \quad (2)$$

As such, the first read labeled position O(0)=I(0) which is the first write labeled position; the second read labeled position O(1)=I((1%8)×80+(1/8))=I(80); the third write labeled position O(2)=I((2%8)×80+(2/8))=I(160); . . . etc. Therefore, based on formula (2) O(3)=I(240), O(4)=I(320), O(5)=I(400), O(6)=I(480), and O(7)=I(560). As O(0), O(1), O(2), O(3), O(4), O(5), O(6) and O(7) are read in sequence from the buffer memory 1 and correspond to I(0), I(80), I(160), I(240), I(320), I(400), I(480) and I(560), the output data stream can contain the first data block. Then, O(8), O(9), . . . etc. are read for outputting the other data blocks.

The label memory 2 is used for storing write and read labeled positions. Since the present invention permits overlapping read and write operations, the label memory 2 must store the write and read labeled positions I(0) ~I(639) and O(0)~O(639) therein. Thus, in this embodiment, the label memory 2 should have a memory space of $2\times 2^{10}$ bytes, which is sufficient to provide first and second memory areas. The first memory area is referenced by the buffer controller 3 when accessing the addressable locations of the buffer memory 1 during first write and read operations. The second memory area is used by the buffer controller 3 for storing updated labeled positions calculated from the labeled positions in the first memory area and referenced by the buffer controller 3 when the latter accesses the addressable locations of the buffer memory 1 during second write and read operations. When the buffer controller 3 performs the second write and read operations, the labeled positions in the first memory area will be updated to reflect those to be referenced by the buffer controller 3 during third write and read operations. Therefore, the buffer controller 3 can, on the one hand, reference the labeled positions stored in the label memory 2 for current write and read operations, and, on the other hand, updates the labeled positions stored in the label memory 2 for subsequent write and read operations.

For convenience of illustration, in the following description, the labeled positions are directly labeled on the buffer memory 1. However, it should be borne in mind that the labeled positions are in fact stored in the label memory 2 for access by the buffer controller 3.

The buffer controller 3 is connected to the buffer memory 1 and the label memory 2, controls the writing of the input data stream into the addressable locations of the buffer memory 1 in accordance with the write labeled positions and a write data sequence I(0), I(1), . . . , I(639), calculates the read labeled positions corresponding to the write labeled positions in accordance with the write data sequence and a read data sequence based on the aforementioned formula (2), updates the read labeled positions stored in the label memory 2, and, in accordance with the read data sequence, reads data from the addressable locations of the buffer memory 1 with reference to the read labeled positions stored in the label memory 2 so as to generate the output data stream.

Operation of the buffer device 100 according to the first preferred embodiment will now be described in greater detail with reference to FIGS. 5 to 10.

1) First Write Operation:

Referring to FIG. 5, the buffer controller 3 refers to the write labeled positions in the label memory 2 so as to write the input data stream into the buffer memory 1 according to the sequence $I_1(0)$, $I_1(1)$, $I_1(2)$, . . . .

Figure 6:
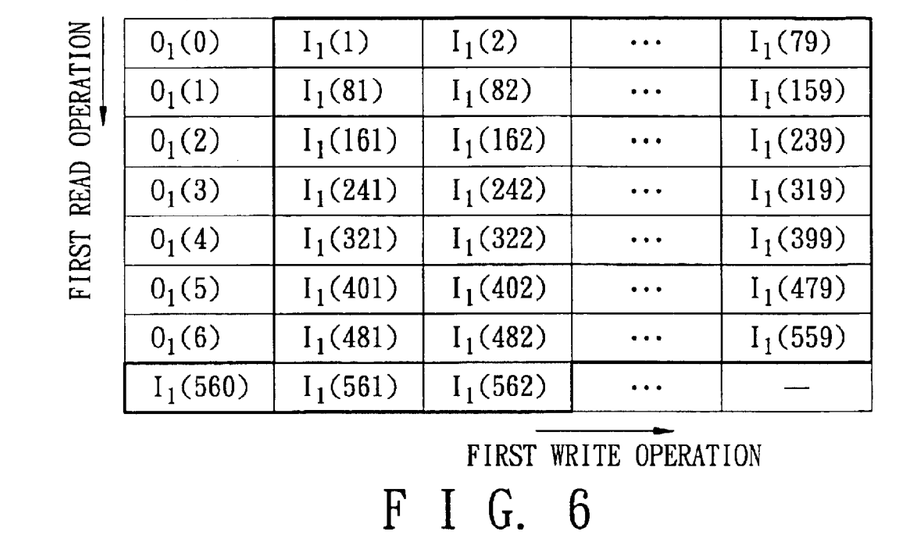

2) First Read Operation:

Referring to FIG. 6, in the present invention, a read operation may be started even before completion of a current write operation. For instance, in this embodiment, before the last row of addressable locations corresponding to the write labeled positions $I_1(560) \sim I_1(639)$ are filled with data, reading of the data from the buffer memory 1 can begin. That is, even before a write operation of the input data stream is completed, a read operation to generate the output data stream can be started.

As described in the foregoing, the read labeled positions $O_1(0), O_1(1), O_1(2), \ldots$ are obtained through calculations of the buffer controller 3 according to the aforementioned formula (2). Hence, the buffer controller 3 refers to the read labeled positions in the label memory 2 when reading data from the addressable locations of the buffer memory 1 according to the sequence $O_1(0), O_1(1), O_1(2), \ldots$ (which correspond to the addressable locations having write labeled positions $I_1(0), I_1(80), I_1(160), \ldots$).

Moreover, during the read operation, writing in the addressable locations corresponding to the write labeled positions $I_1(560) \sim I_1(639)$ can proceed at the same time without affecting reading of the addressable locations corresponding to $O_1(0) \sim O(7)$.

Figure 7:
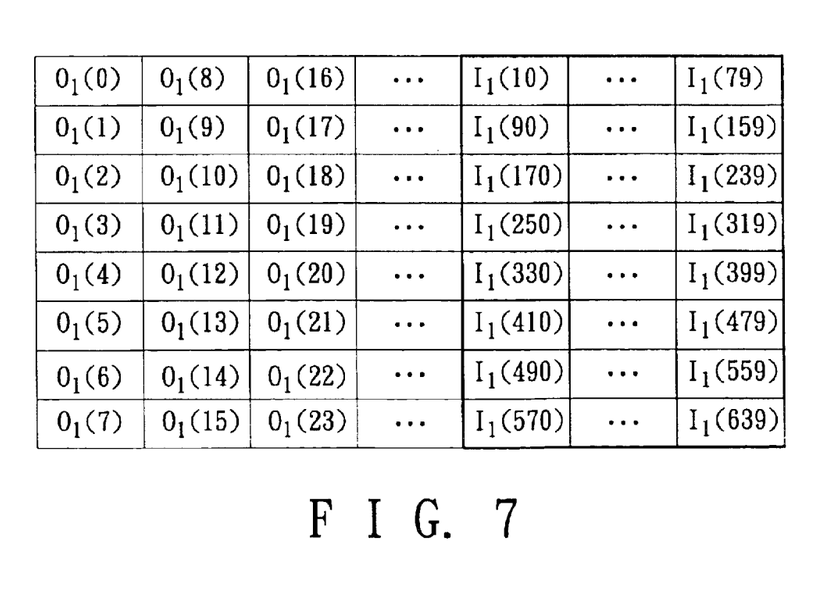
Figure 8:
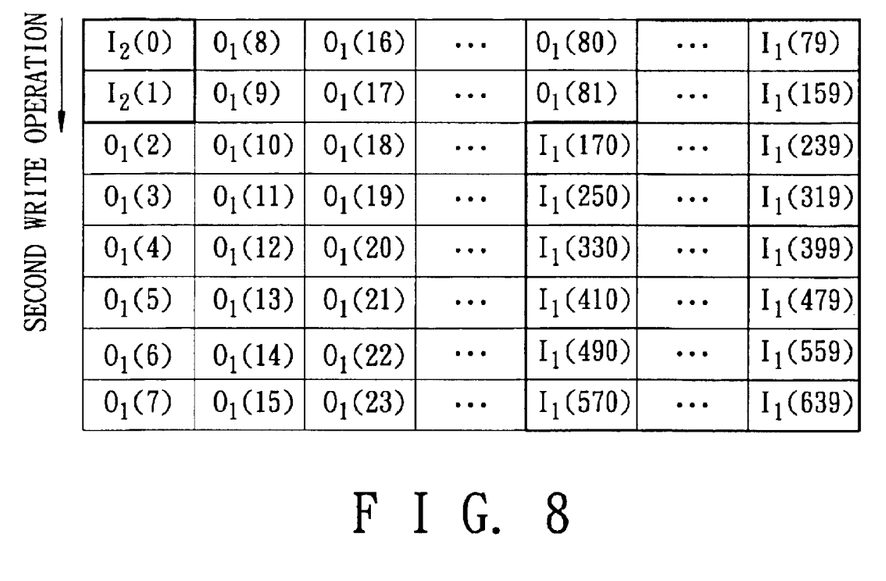

3) Second Write Operation:

As shown in FIG. 7, at the end of the first write operation, i.e., writing in the addressable location corresponding to $I_1(639)$ has been completed, reading of data in some of the addressable locations of the buffer memory 1 has been completed. Hence, a second write operation can proceed immediately. Based on the following formula (3):

$$I_{n+1}(t) = O_n(t) \tag{3}$$

a write labeled position $I_{n+1}(t)$ for a write data sequence (t) of an (n+1)th write operation is equal to $O_n(t)$. In other words, the addressable location that corresponds to $O_1(0)$ during the first read operation further corresponds to $I_2(0)$ during the second write operation. Therefore, writing of the input data stream during the second write operation proceeds in the sequence $I_2(0), I_2(1), \ldots$ which also corresponds to the sequence $O_1(0), O_1(1), \ldots$, as shown in FIG. 8.

Figure 9:
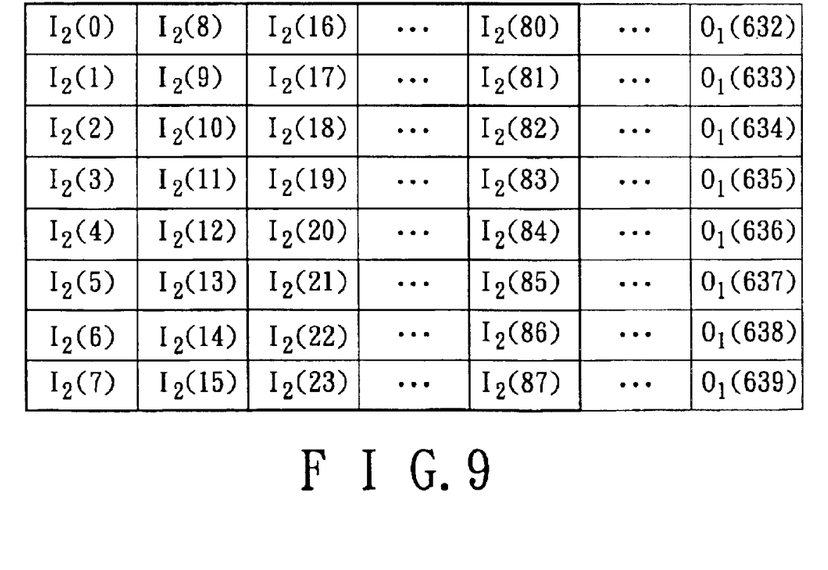
Figure 10:
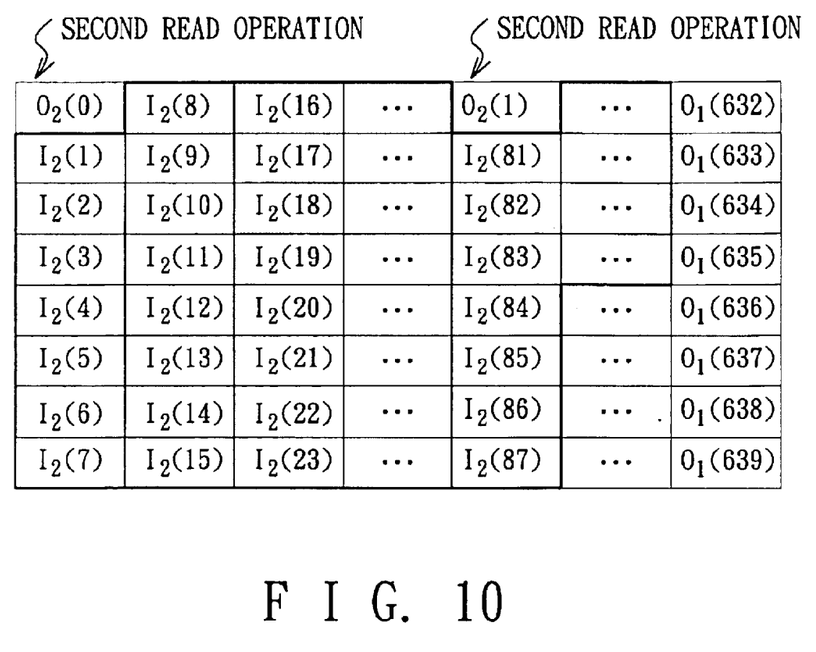

4) Second Read Operation:

As shown in FIG. 9, at the end of the first read operation, i.e., reading of the addressable location corresponding to $O_1(639)$ has been completed, writing of data into some of the addressable locations of the buffer memory 1 has been completed. Hence, a second read operation can proceed immediately. As shown in FIG. 10, the read labeled positions $O_2(0), O_2(1), \ldots$ for the second read operation are obtained through calculations of the buffer controller 3 according to the aforementioned formula (2) and correspond to the write labeled positions $I_2(0), I_2(80), \ldots$. In other words, although the second write operation is performed in sequence from top to bottom and from left to right, the buffer controller 3 can still calculate the desired read labeled positions $O_2(0), O_2(1), \ldots$ corresponding to the write labeled positions $I_2(0), I_2(80), \ldots$. In this manner, the output data stream still contains data in units of blocks during the second read operation.

Therefore, through iteration of the aforesaid write and read operations, the output data stream in this embodiment always contains data in units of blocks. As the order of write and read operations increases, the order of reading and writing of the addressable locations grows in complexity. However, as long as the buffer memory 1 is divided into equally sized addressable locations that are labeled with initial positions, even if data of the input data stream are stored in non-adjacent addressable locations, the buffer controller 3 can always generate the desired read and write labeled positions to ensure correct data storage and retrieval by virtue of formulas (2) and (3).

Moreover, for compression of static images using JPEG formats, a separate process is usually employed for each of the three primary colors, i.e., red, green and blue. Hence, three identical buffer memories 1 may be implemented during data stream transformation. In this embodiment, for simplicity of illustration, only one buffer memory 1 is used for demonstration. However, those skilled in the art can easily infer parallel operations of a plurality of buffer memories 1 from the foregoing description.

Figure 11:
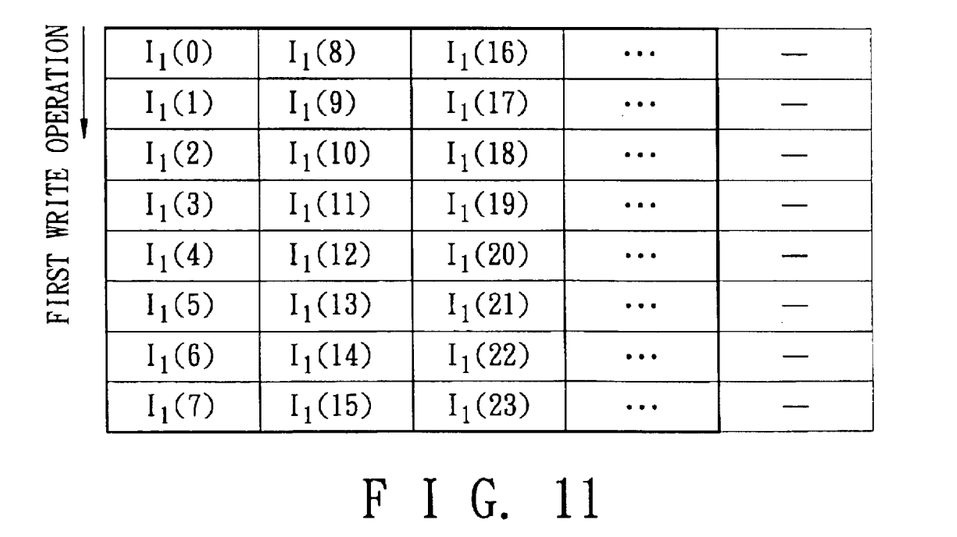
FIGS. 11 to 15 illustrate buffer content during consecutive write and read operations for transforming a block-based data stream into a line-based data stream according to the second preferred embodiment of a buffer device for data stream transformation of the present invention.

Referring to FIGS. 3 and 11, the second preferred embodiment of this invention has an identical hardware structure as the previous embodiment. However, the buffer device 100 of this embodiment is used to transform a block-based input data stream to a line-based output data stream, which is the inverse of the process of the first preferred embodiment, and is thus suitable for application in the last stage of the MPEG or JPEG decompression operation.

In this embodiment, the buffer memory 1 also includes a 640×8-byte memory. Each addressable location of the buffer memory 1 also has a size of 8×1bytes. The read and write labeled positions are related to each other based on the formula:

$$O_n(t) = I_n((t \% \ w) \times h + (t/w)) \tag{4}$$

where $O_n(t)$ is the read labeled position for a read data sequence (t) of an nth read operation, $I_n(t)$ is the write labeled position for a write data sequence (t) of an nth write operation, (h) is the height of a data block, (w) is a total number of data blocks that can be accommodated in a single data block row of the buffer memory 1, (t % w) is the remainder of the quotient of (t) divided by (w), and (t/w) is the integer part of the quotient of (t) divided by (w).

In this embodiment, since h=8 and w=80, therefore, formula (4) can be simplified as:

$$O_n(t) = I_n((t \% \ 80) \times 8 + (t/80)) \tag{5}$$

Operation of the buffer device 100 according to the second preferred embodiment will now be described in greater detail with reference to FIGS. 11 to 15.

1) First Write Operation:

Referring to FIG. 11, the buffer controller 3 refers the write labeled positions in the label memory 2 so as to write the block-based input data stream into the buffer memory 1 according to the sequence $I_1(0), I_1(1), I_1(2), \ldots$.

Figure 12:
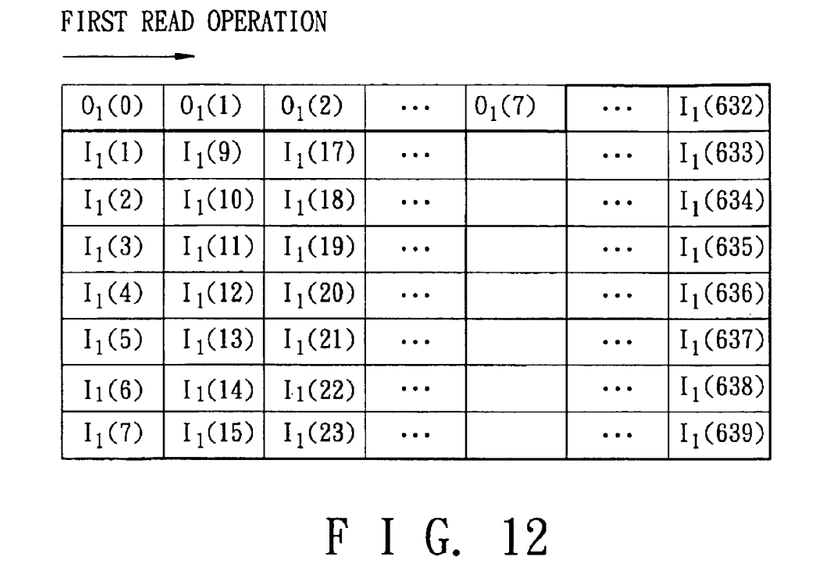

2) First Read Operation:

Referring to FIG. 12, like the previous embodiment, a read operation may be started even before completion of a current write operation. For instance, in this embodiment, before the last column of addressable locations corresponding to the write labeled positions $I_1(632) \sim I_1(639)$ are filled with data, reading of the data from the buffer memory 1 can begin. That is, even before a write operation of the input data stream is completed, a read operation to generate the output data stream can be started.

As described in the foregoing, the read labeled positions $O_1(0), O_1(1), O_1(2), \ldots$ are obtained through calculations of the buffer controller 3 according to the aforementioned formula (5). Hence, the buffer controller 3 refers to the read labeled positions in the label memory 2 when reading data from the addressable locations of the buffer memory 1 according to the sequence $O_1(0), O_1(1), O_1(2), \ldots$ (which correspond to the addressable locations having write labeled positions $I_1(0)$, $I_1(8)$, $I_1(16)$, . . . ,) so as to result in the line-based output data stream.

Moreover, during the reading operation, writing in the addressable locations corresponding to the write labeled positions $I_1(632)$~$I_1(639)$ can proceed at the same time.

Figure 13:
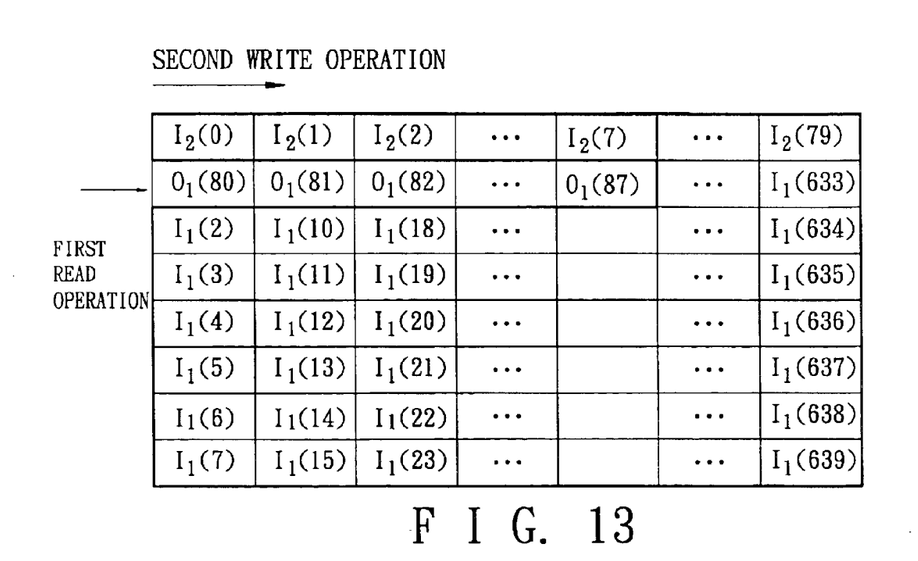

3) Second Write Operation:

At the end of the first write operation, i.e., writing in the addressable location corresponding to $I_1(639)$ has been completed, reading of data in some of the addressable locations of the buffer memory 1 has been completed. Hence, a second write operation can proceed immediately. Based on the aforesaid formula (3): $I_{n+1}(t)=O_n(t)$, writing of the input data stream during the second write operation proceeds in the sequence $I_2(0)$, $I_2(1)$, . . . which also corresponds to the sequence $O_1(0)$, $O_1(1)$, . . . , as shown in FIG. 13.

Figure 14:
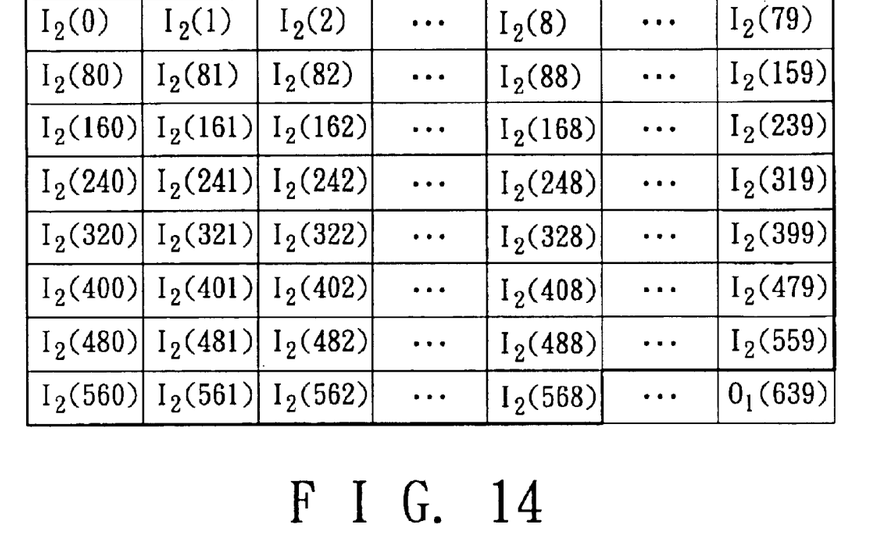
Figure 15:
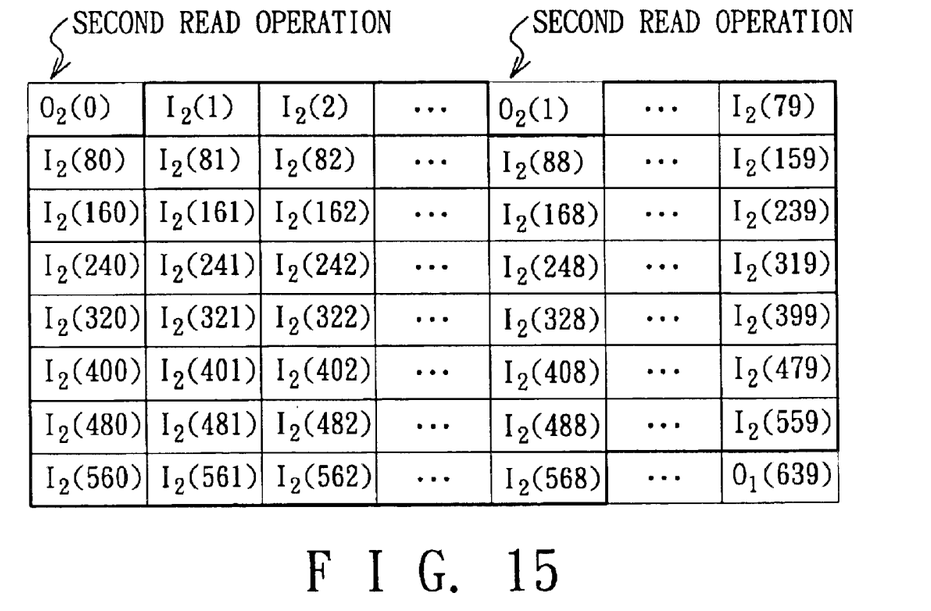

4) Second Read Operation:

Referring to FIG. 14, at the end of the first read operation, i.e., reading of the addressable location corresponding to $O_1(639)$ has been completed, the second read operation can proceed immediately. As shown in FIG. 15, the read labeled positions $O_2(0)$, $O_2(1)$, . . . for the second read operation are obtained through calculations of the buffer controller 3 according to the aforementioned formula (5) and correspond to the write labeled positions $I_2(0)$, $I_2(8)$, $I_2(16)$, . . . . In other words, although the second write operation is performed in sequence from left to right and from top to bottom, the buffer controller 3 can still calculate the desired read labeled positions $O_2(0)$, $O_2(1)$, . . . corresponding to the write labeled positions $I_2(0)$, $I_2(8)$, . . . . In this manner, the output data stream still contains data in units of lines during the second read operation.

Therefore, even if data of the block-based input data stream are stored in non-adjacent addressable locations, the buffer controller 3 can always generate the desired read and write labeled positions to ensure correct data storage and retrieval by virtue of formulas (5) and (3).

In sum, this invention provides a method and buffer device for data stream transformation by labeling a buffer memory and through formulas (1), (3) and (4) to permit data stream transformation between line-based and block-based data streams. When compared with the prior art, although a label memory 2 with a small memory space for storing read and write labeled positions is required, the size of the buffer memory 1 is reduced by half.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for transforming an input data stream into an output data stream, one of the input and output data streams being a line-based data stream, the other of the input and output data streams being a block-based data stream, said method comprising the steps of:

a) assigning addressable locations of a buffer memory with write labeled positions according to a write data sequence;

b) writing the input data stream into the addressable locations of the buffer memory in accordance with the write labeled positions and the write data sequence;

c) calculating read labeled positions corresponding to the write labeled positions in accordance with the write data sequence and a read data sequence; and    d) in accordance with the read data sequence, reading data from the addressable locations of the buffer memory with reference to the read labeled positions so as to generate the output data stream.

2. The method as claimed in claim 1, the input data stream being a line-based data stream, the output data stream being a block-based data stream, wherein, in step (c), the read labeled positions are calculated based on the formula:

$$O_n(t)=I_n((t\%h)\times w+(t/h))$$

where $O_n(t)$ is the read labeled position for a read data sequence (t) of an nth read operation, $I_n(t)$ is the write labeled position for a write data sequence (t) of an nth write operation, (h) is the height of a data block, (w) is a total number of data blocks that can be accommodated in a single data block row of the buffer memory, (t % h) is the remainder of the quotient of (t) divided by (h), and (t/h) is the integer part of the quotient of (t) divided by (h).

3. The method as claimed in claim 2, further comprising the steps of repeating steps b) to d), wherein, in the step b) that follows the step d), a write labeled position $I_{n+1}(t)$ for a write data sequence (t) of an (n+1)th write operation is equal to $O_n(t)$.

4. The method as claimed in claim 1, the input data stream being a block-based data stream, the output data stream being a line-based data stream, wherein, in step (c), the read labeled positions are calculated based on the formula:

$$O_n(t)=I_n((t\% w)\times h+(t/w))$$

where $O_n(t)$ is the read labeled position for a read data sequence (t) of an nth read operation, $I_n(t)$ is the write labeled position for a write data sequence (t) of an nth write operation, (h) is the height of a data block, (w) is a total number of data blocks that can be accommodated in a single data block row of the buffer memory, (t % w) is the remainder of the quotient of (t) divided by (w), and (t/w) is the integer part of the quotient of (t) divided by (w).

5. The method as claimed in claim 4, further comprising the steps of repeating steps b) to d), wherein, in the step b) that follows the step d), the write labeled position $I_{n+1}(t)$ for a write data sequence (t) of an (n+1)th write operation is equal to $O_n(t)$.

6. The method as claimed in claim 1, wherein the write and read labeled positions are stored in a label memory.

7. A buffer device for transforming an input data stream into an output data stream, one of the input and output data streams being a line-based data stream, the other of the input and output data streams being a block-based data stream, said buffer device comprising:

a buffer memory adapted to be configured into addressable locations for writing the input data stream therein;

a label memory for storing write and read labeled positions; and    a buffer controller connected to said buffer memory and said label memory, said buffer controller      controlling the writing of the input data stream into the addressable locations of said buffer memory in accordance with the write labeled positions and a write data sequence,      calculating the read labeled positions corresponding to the write labeled positions in accordance with the write data sequence and a read data sequence, and updating the read labeled positions stored in said label memory, and in accordance with the read data sequence, reading data from the addressable locations of said buffer memory with reference to the read labeled positions stored in said label memory so as to generate the output data stream.

8. The buffer device as claimed in claim 7, the input data stream being a line-based data stream, the output data stream being a block-based data stream, wherein said buffer controller calculates the read labeled positions based on the formula:

$$O_n(t)=I_n((t\% \ h) \times w+(t/h))$$

where $O_n(t)$ is the read labeled position for a read data sequence (t) of an nth read operation, $I_n(t)$ is the write labeled position for a write data sequence (t) of an nth write operation, (h) is the height of a data block, (w) is a total number of data blocks that can be accommodated in a single data block row of the buffer memory, (t % h) is the remainder of the quotient of (t) divided by (h), and (t/h) is the integer part of the quotient of (t) divided by (h).

9. The buffer device as claimed in claim 8, wherein said buffer controller assigns a write labeled position $I_{n+1}(t)$ for a write data sequence (t) of an (n+1)th write operation as being equal to the read labeled position $O_n(t)$ for a read data sequence (t) of an nth read operation.

10. The buffer device as claimed in claim 7, the input data stream being a block-based data stream, the output data stream being a line-based data stream, wherein said buffer controller calculates the read labeled positions based on the formula:

$$O_n(t)=I_n((t\% \ w) \times h+(t/w))$$

where $O_n(t)$ is the read labeled position for a read data sequence (t) of an nth read operation, $I_n(t)$ is the write labeled position for a write data sequence (t) of an nth write operation, (h) is the height of a data block, (w) is a total number of data blocks that can be accommodated in a single data block row of the buffer memory, (t % w) is the remainder of the quotient of (t) divided by (w), and (t/w) is the integer part of the quotient of (t) divided by (w).

11. The buffer device as claimed in claim 10, wherein said buffer controller assigns a write labeled position $I_{n+1}(t)$ for a write data sequence (t) of an (n+1)th write operation as being equal to the read labeled position $O_n(t)$ for a read data sequence (t) of an nth read operation.

* * * * *